United States Patent Office 3,037,976
Patented June 5, 1962

3,037,976
6-CYANO-16α-HYDROXY-CORTICAL HORMONES
Albert Bowers and Howard J. Ringold, Mexico City, Mexico, assignors to Syntex S.A., Mexico City, Mexico, a corporation of Mexico
No Drawing. Filed Aug. 25, 1959, Ser. No. 835,849
Claims priority, application Mexico Sept. 27, 1958
12 Claims. (Cl. 260—239.55)

This invention relates to certain new cyclopentanoperhydrophenanthrene derivatives.

More particularly, it relates to the novel steroidal 6-cyano-16α-hydroxy-cortical hormones, more specifically to 6α - cyano - 16α-hydroxy-cortisone, -hydrocortisone, -prednisone and -prednisolone, and to the 6-dehydro derivatives of such compounds, which compounds may optionally be fluorinated at C-9α and/or condensed at C-16,17 with an aldehyde or ketone having up to about 12 carbon atoms and/or esterified at C-21 or at C-16 and C-21 with radicals of hydrocarbon carboxylic acids having up to about 12 carbon atoms. These new compounds are represented by the following formulas:

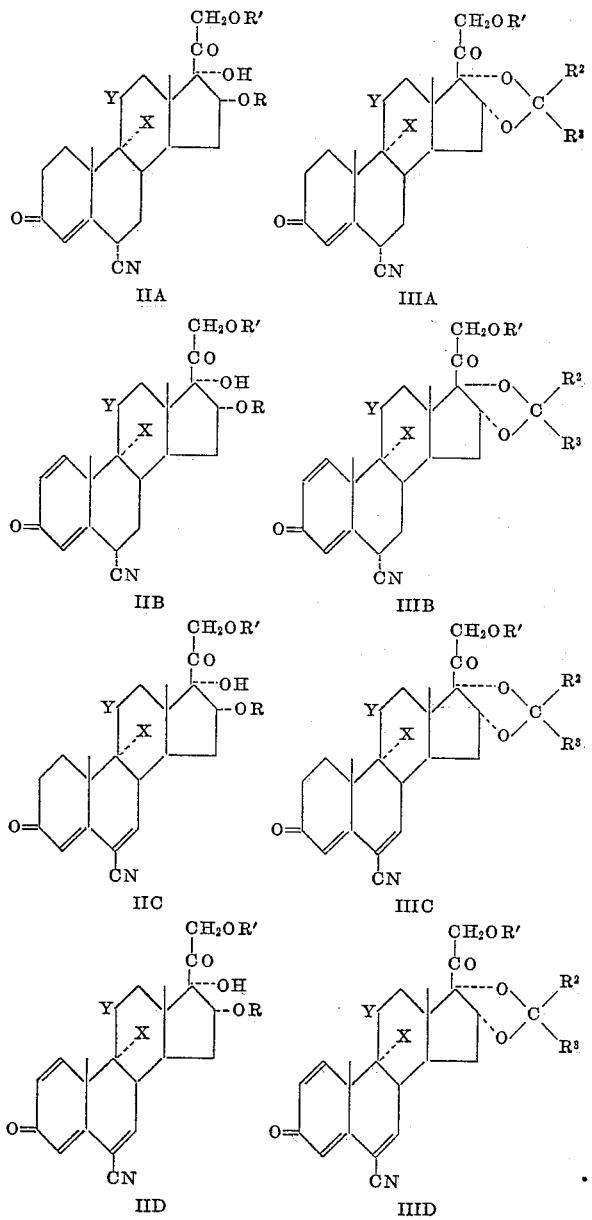

in which formulas X is a member of the group consisting of hydrogen and fluorine, Y is an arrangement selected from the group consisting of

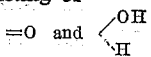

R and R' respectively are members of the group consisting of hydrogen and acyl radicals derived from a hydrocarboxylic acid of up to 12 carbon atoms, saturated or unsaturated, of straight, branched, cyclic or mixed straight (branched)-cyclic chain, optionally substituted with functional groups such as methoxy, chlorine or bromine; typical esters formed with such acyl radicals are, among others, the acetates, propionates, isobutyrates, hemisuccinates, enanthates, caproates, benzoates, trimethylacetates, phenoxyacetates, cyclopentylpropionates, phenylpropionates and β-chloropropionates. In the ketals and acetals corresponding to the above general Formulas IIIA–IIID, $R^2$ and $R^3$ are members of the group consisting of hydrogen and of hydrocarbon radicals which may be aliphatic of straight chain, branched, cyclic or mixed straight(branched)-cyclic molecules of up to about 12 carbon atoms, substituted or not with functional groups, or may be aromatic hydrocarbons or mixed aliphatic-aromatic hydrocarbons; typical ketals are those formed with acetone, methylethylketone, butanone, cyclohexanone (in this case $R^2$ and $R^3$ form part of the cyclohexyl ring) or benzophenone; typical acetals are those formed with formaldehyde, acetaldehyde, benzaldehyde or furfural.

These new compounds which are the object of the present invention are potent anti-inflammatory agents having glycogenic, catabolic, anti-estrogenic and anti-androgenic activity.

As starting materials for the production of these new compounds, there are used the corresponding 6-cyano cortical hormones without the hydroxyl group at C-16α which have been recently described and claimed in our patent application Serial No. 835,848 filed on August 25, 1959. These compounds are 6α-cyano-cortisone, -hydrocortisone, -prednisone and -prednisolone, as well as their 6-cyano-6-dehydro derivatives. Sources for the corresponding 9α-fluoro compounds are mentioned hereinafter.

These starting materials can be represented by the general formulas:

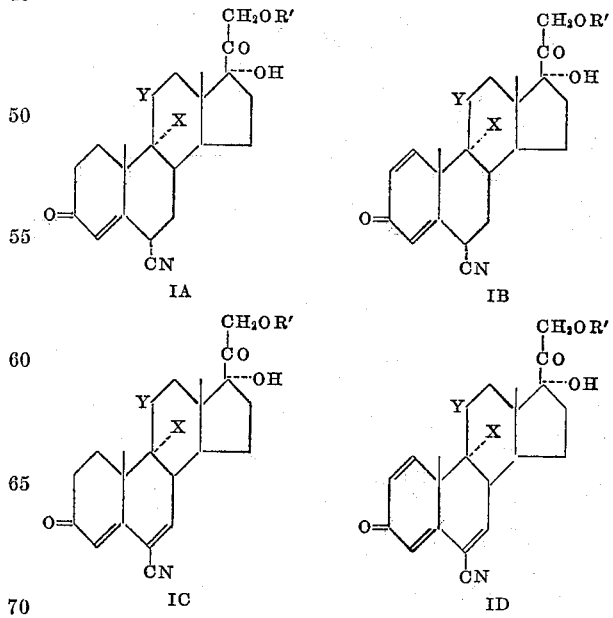

wherein R', X and Y have the same meaning as explained above.

These starting materials IA to ID can in turn be produced from the 3-alkyleneketal-5α,6α-oxido-17,20;20,21-bis-methylenedioxy derivatives of cortisone, cortisol, and the 9α-fluoro analogs of the aforesaid compounds. These 3-alkyleneketal-5α,6α-oxido-17,20;20,21-bis-methylenedioxy derivatives were obtained from the corresponding 17,20;20,21-bis-methylenedioxy derivatives by conventional process steps. The last mentioned bis-methylenedioxy derivatives are obtained by the method described by Sarett et al. in J.A.C.S., 80, 1518 (1958) from the corresponding basic compounds described, for instance, by Fried et al. in J.A.C.S., 76, 1455 (1954), Sarett et al. in J.A.C.S., 80, 3160 et seq. (1958) and in the copending patent application Serial No. 789,248, filed January 27, 1959.

The following reaction diagram illustrates the process of producing the new compounds according to the present invention from the above-described starting materials IA to ID prepared as described in the copending application Serial No. 835,848 filed August 25, 1959.

REACTION DIAGRAM

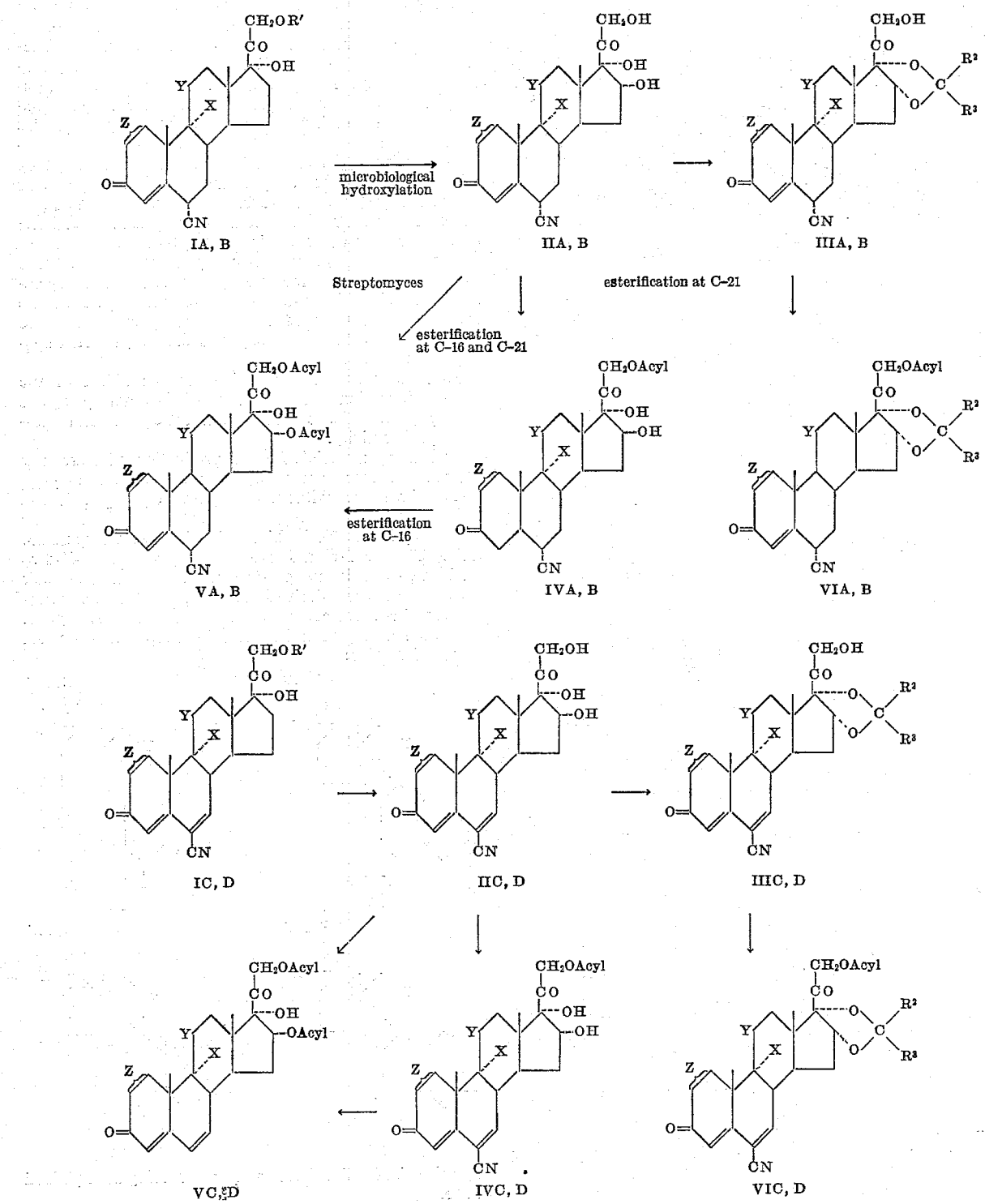

It will be apparent from the above reaction diagram that R in formulas IIA to IID and IIIA to IIID given hereinbefore can only be acyl if R' is also acyl.

The process illustrated in the above reaction diagram, in which X, Y and R' have the same meaning as explained above and Z designates a member of the group consisting of C—C and C=C, comprises the steps of incubating the starting compounds IA, IB, IC or ID with a growing vegetating culture of the fungus *Streptomyces roseochromogenus*, preferably *Streptomyces roseochromogenus* ATCC 3347, for a prolonged period of time in an aqueous medium of peptone and corn syrup at temperatures around 28° C.; the product of this incubation is isolated by extraction and purified by chromatography; there are thus obtained the $16\alpha$-hydroxy-compounds represented by formulas IIA to IID. A mixture of anyone of these $16\alpha$-hydroxy-compounds with an aldehyde or ketone of the type set forth above was treated with catalytic amounts of perchloric acid, preferably at temperatures around room temperature, to produce the cyclic 16,17-ketals or the cyclic 16,17-acetals (IIIA to IIID), respectively.

In the compounds of formulas IIA to IID the hydroxyl group at C–21 was selectively esterified by reaction with 1.1 molar equivalents of a hydrocarbon carboxylic acid anhydride of the type described above, in pyridine solution and at temperatures around 0° C., thus leading to compounds IVA to IVD the hydroxyl group at C–16 can be esterified with the anhydride of another acid, in pyridine solution at room temperature VA to VD; alternatively, we esterified simultaneously both hydroxyl groups of compounds IIA to IID by the latter method; by the reaction with the anhydride in pyridine solution at room temperature we further prepared the 21-esters (VIA to VID) of the ketalized or acetalized compounds.

The following examples and preparations serve to illustrate our invention without being intended to restrict the scope of the latter.

*Example I*

17,20;20,21 - bis-methylenedioxy - $\Delta^4$ - pregnene - 3,11-dione was prepared from cortisone according to the method of Sarett et al. (J.A.C.S., 80, 1518 (1958)), that is, by treatment of a chloroform solution of the steroid with aqueous concentrated formaldehyde and concentrated hydrochloric acid at room temperature for 48 hours.

A mixture of 5 g. of 17,20;20,21-bis-methylenedioxy-$\Delta^4$-pregnene-3,11-dione, 300 cc. of anyhdrous benzene, 35 cc. of ethyleneglycol and 250 mg. of p-toluenesulfonic acid monohydrate was refluxed for 12 hours with the use of a water separator; the cooled mixture was treated with 50 cc. of 2 N aqueous solution of sodium carbonate and 500 cc. of water and the organic layer was separated, washed with water, dried over anhydrous sodium sulfate and the benzene was evaporated under reduced pressure. There was thus obtained 3-ethylenedioxy - 17,20;20,21 - bis - methylenedioxy - $\Delta^4$ - pregnen-11-one in crude form, which was used as such for the next stage, without further purification. The pure compound may be obtained by chromatography on neutral alumina.

The above crude compound was dissolved in 100 cc. of chloroform, cooled to 0° C. and treated with an ether solution of 1.2 molar equivalents of monoperphthalic acid; the mixture was allowed to react at room temperature in the dark for 16 hours, then diluted with water and the organic layer was separated, washed with water, dried over anhydrous sodium sulfate and the solvent was evaporated under reduced pressure. By chromatography on neutral alumina there was obtained 3-ethylenedioxy-17,20;20,21 - bis - methylenedioxy - $5\alpha,6\alpha$ - oxido - pregnan-11-one (I).

A mixture of 5 g. of 3-ethylenedioxy-17,20;20,21-bis-methylenedioxy-$5\alpha,6\alpha$-oxido-pregnan-11-one, 10 g. of potassium cyanide and 200 cc. of ethyleneglycol was refluxed for one and a half hours, poured into ice water and the precipitate consisting of 3-ethylenedioxy-6-cyano-17,20;20,21 - bis - methylenedioxy - $\Delta^5$ - pregnen - 11-one (II) was collected by filtration.

The above compound was heated with 100 cc. of 60% formic acid on the steam bath for 1 hour, cooled, diluted with water and the precipitate was collected, washed with water, dried and recrystallized from acetone-hexane, thus affording the pure $6\alpha$-cyano-cortisone (III).

There was then prepared a sporulated culture of *Streptomyces roseochromogenus* (ATCC 3347) in an inclined agar medium containing 1% of glucose, and 1% of yeast extract. 50 cc. of a sterile aqueous medium of 2% of peptone and 5% of corn syrup contained in each of a series of 250 cc. Erlenmeyer flasks was inoculated with 1 cc. of a suspension of the above culture to each flask; the flasks were then incubated in a stirring machine at 28° C. under aeration for 24–48 hours. A growing vegetating culture of *Streptomyces roseochromogenus* was thus obtained which was used for the subsequent incubation with $6\alpha$-cyano-cortisone.

To each batch of 50 cc. of this vegetating culture of *Streptomyces roseochromogenus* there was added 20 mg. of $6\alpha$-cyano-cortisone dissolved in 0.4 cc. of ethanol and the mixture was stirred at 28° C. under aeration for 48 hours; it was then extracted several times with methylene chloride and the extract was washed with water, dried over anhydrous sodium sulfate and evaporated to dryness under reduced pressure. The residue was chromatographed on silica gel, thus affording $6\alpha$-cyano-$16\alpha$-hydroxy-cortisone.

A solution of 1 g. of $6\alpha$-cyano-$16\alpha$-hydroxy-cortisone in 5 cc. of pyridine was cooled to 0° C. and treated with 0.27 cc. (ca. 1.1 molar equivalents) of acetic anhydride. The mixture was allowed to react overnight at 0° C. and then poured into ice water; the precipitate was collected by filtration, washed with water, dried and recrystallized from acetone-hexane. There was thus obtained the 21-acetate of $6\alpha$-cyano-$16\alpha$-hydroxy-cortisone.

1 g. of the above compound was treated with 1 cc. of propionic anhydride in mixture with 5 cc. of pyridine and kept overnight at room temperature. After pouring into water the mixture was heated on the steam bath for half an hour, cooled and the precipitate was collected, washed with water, dried and recrystallized from acetone-hexane. There was thus obtained the 16-propionate-21-acetate of $6\alpha$-cyano-$16\alpha$-hydroxy-cortisone.

*Example II*

Example I is repeated with $9\alpha$-fluoro-cortisol (see Fried et al., supra) and there is obtained $6\alpha$-cyano-$9\alpha$-fluoro-cortisol via the corresponding 3-ethylenedioxy-$5\alpha,6\alpha$-oxido-17,20;20,21-bis-methylenedioxy-intermediate.

2 g. of $6\alpha$-cyano-$9\alpha$-fluoro-cortisol was incubated with *Streptomyces roseochromogenus* in accordance with the procedure described in the preceding example. There was thus obtained $6\alpha$-cyano-$16\alpha$-hydroxy-$9\alpha$-fluoro-cortisol.

A mixture of 1 g. of the above compound, 5 cc. of pyridine and 1.2 cc. of acetic anhydride was kept overnight at room temperature, poured into water, heated for half an hour on the steam bath, cooled and the precipitate was collected, washed with water, dried and recrystallized from acetone-hexane. There was thus obtained the 16,21-diacetate of $6\alpha$-cyano-$16\alpha$-hydroxy-$9\alpha$-fluoro-cortisol.

*Example III*

A solution of 5 g. of $6\alpha$-cyano-cortisone obtained in accordance with Example I in 100 cc. of 50% acetic acid was heated at 100° C. for 7 hours. The crude product was isolated by dilution with water and filtration of the precipitate; the dried product was treated with 5 cc. of acetic anhydride and 30 cc. of pyridine and kept for 2 hours at room temperature. After diluting with water the mixture was heated on the steam bath for half an hour, cooled and the precipitate was collected, washed with water, dried and recrystallized from acetone-hexane, thus yielding 6α-cyano-cortisone 21-acetate.

A mixture of 5 g. of 6α-cyano-cortisone 21-acetate, 250 cc. of t-butanol, 0.5 cc. of pyridine and 1.6 g. of recently sublimed selenium dioxide was refluxed under an atmosphere of nitrogen for 48 hours and then filtered through celite, washing the filter with a little hot ethyl acetate; the combined filtrate and washings was evaporated to dryness under reduced pressure and the residue was dissolved in acetone, refluxed with charcoal for 1 hour and filtered. The acetone was evaporated and the residue was purified by chromatography on neutral alumina. There was thus obtained the 21-acetate of 6α-cyano-prednisone (VI).

The 21-acetate of 6α-cyano-prednisone was saponified in conventional manner to obtain the free 6α-cyano-prednisone.

In accordance with the method of incubation with *Streptomyces roseochromogenus* described in the preceding examples, 2 g. of 6α-cyano-prednisone was converted into 6α-cyano-16α-hydroxy-prednisone.

1 g. of such compound was mixed with 25 cc. of anhydrous acetone, treated with 5 drops of 70% perchloric acid and stirred at room temperature for 1 hour. The mixture was then poured into ice cold 5% aqueous sodium bicarbonate solution and the formed precipitate was collected, washed with aqueous saturated sodium chloride solution and then with a little cold water, dried and recrystallized from acetone-hexane. The 16,17-acetonide of 6α-cyano-16α-hydroxy-prednisone was thus obtained.

*Example IV*

A mixture of 1 g. of 6α-cyano-16α-hydroxy-cortisone obtained as described in Example I, and 50 cc. of benzene was treated with 5 g. of paraldehyde and 5 drops of 70% perchloric acid and stirred at room temperature for 2 hours. After pouring into 200 cc. of water the organic phase was separated, washed with 5% aqueous sodium bicarbonate solution and then with water, dried over anhydrous sodium sulfate and the benzene was evaporated. The residue was purified by chromatography on neutral alumina, thus producing 16α,17α-methylenedioxy-6α-cyano - Δ⁴ - pregnen - 21 - ol - 3,11,20 - trione (16,17-(formaldehyde)-acetal of 6α-cyano-16α-hydroxy-cortisone).

1 g. of the above compound was treated with 2 cc. of cyclopentylpropionic anhydride in mixture with 5 cc. of pyridine and kept for 24 hours at room temperature; it was then poured into water and the precipitate was collected, washed with water, dried and recrystallized from acetone-hexane. There was thus obtained the 21-cyclopentylpropionate of 6α-cyano-16α,17α-methylenedioxy-Δ⁴-pregnen-21-ol-3,11,20-trione.

*Example V*

9α-fluoro-cortisol described by Fried et al. in J.A.C.S., 76, 1455 (1954), is treated in the same manner as described in Examples I and III to obtain 6α-cyano-9α-fluoro-prednisolone.

A solution of 5 g. of 6α-cyano-9α-fluoro prednisolone in 90 cc. of t-butanol was added to 1.1 molar equivalents of sodium methoxide prepared by dissolving the corresponding amount of sodium metal in absolute methanol and evaporating the methanol under anhydrous conditions. The mixture was stirred at room temperature for 30 minutes and then a solution of 1.1 molar equivalents of bromine in 30 cc. of t-butanol was added little by little, under stirring and maintaining the temperature below 15° C. The mixture was kept for half an hour at room temperature, diluted with water and the precipitate was collected, washed with water, and dried in vacuo. There was thus obtained 6-cyano-6-bromo-prednisolone which was used for the next step without further purification. A pure sample of the cyano-bromo compound was obtained by recrystallization from acetone-hexane at low temperature.

A solution of 3 g. of the above crude compound in 20 cc. of dimethylformamide was added to a suspension of 1.5 g. of calcium carbonate in 30 cc. of dimethylformamide. The mixture was refluxed for 15 minutes, concentrated to about 20 cc. under reduced pressure, cooled, poured into aqueous saturated sodium chloride solution and the precipitate was collected, washed with water, dried and recrystallized from acetone-hexane. There was thus obtained 6 - cyano-9α-fluoro-Δ¹,⁴,⁶-pregnadien-11β,17α,21-triol-3,20-dione (6-cyano-9α-fluoro - 6 - dehydro-prednisolone).

1 g. of 6-cyano-9α-fluoro-6-dehydro-prednisolone was converted into 6-cyano-9α-fluoro-16α-hydroxy-6-dehydro-prednisolone, in accordance with the method of incubation described in Example I.

500 mg. of the above compound was dissolved in 50 cc. of cyclohexanone, treated with 5 drops of 70% perchloric acid and the mixture was stirred at room temperature for 2 hours and diluted with 50 cc. of 1% aqueous sodium bicarbonate solution. The organic layer was separated, washed with 10 cc. of water, dried over anhydrous sodium sulfate and the cyclohexanone was evaporated under reduced pressure. The residue was purified by chromatography on neutral alumina. There was thus obtained 16α,17α-cyclohexyldioxy - 6 - cyano - 9α - fluoro-Δ¹,⁴,⁶-pregnatriene - 11β,16α,17α,21 - tetrol - 11β,21 - diol-3,20-dione (16,17-(cyclohexanone) - ketal of 9α - fluoro-16α-hydroxy-6-dehydro-6-cyano-prednisolone).

A mixture of 300 mg. of the above compound, 3 cc. of pyridine and 0.5 cc. of acetic anhydride was kept at room temperature for 4 hours, poured into 20 cc. of saturated aqueous sodium chloride solution and the precipitate was collected, washed with a little cold water, dried and recrystallized from acetone-hexane. There was thus obtained 16α,17α-cyclohexyldioxy-21-acetoxy - 6 - cyano - 9α-fluoro-Δ¹,⁴,⁶-pregnatrien-11β-ol-3,20-dione (21 - acetate of 16,17-(cyclohexanone)-ketal of 6-cyano - 6 - dehydro-9α-fluoro-prednisolone).

We claim:

1. A new 6-cyano-16α-hydroxy steroid derivative having the general formula:

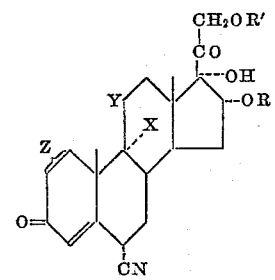

in which both R and R' are members of the group consisting of hydrogen and acyl radicals derived from hydrocarbon carboxylic acids having up to 12 carbon atoms and R' is an acyl radical derived from hydrocarbon carboxylic acids of up to 12 carbon atoms when R is hydrogen, X is a member of the group consisting of hydrogen and fluorine, Y is an arrangement selected from the group consisting of

and Z is a member of the group consisting of a double bond between C–1 and C–2 and a single bond between C–1 and C–2.

2. A new 6-cyano-16α-hydroxy steroid derivative having the general formula:

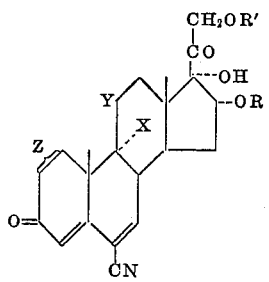

in which both R and R' are members of the group consisting of hydrogen and acyl radicals derived from hydrocarbon carboxylic acids having up to 12 carbon atoms and R' is an acyl radical derived from hydrocarbon carboxylic acids of up to 12 carbon atoms when R is hydrogen, X is a member of the group consisting of hydrogen and fluorine, Y is an arrangement selected from the group consisting of

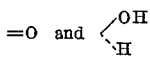

and Z is a member of the group consisting of a double bond between C–1 and C–2 and a single bond between C–1 and C–2.

3. A 6-cyano-ketalic steroidal derivative corresponding to the general formula:

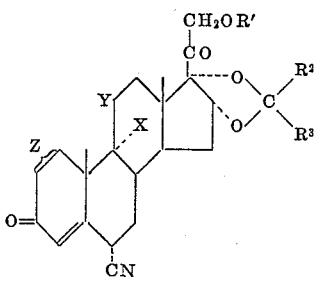

in which R' is a member of the group consisting of hydrogen and acyl radicals derived from hydrocarbon carboxylic acids having up to 12 carbon atoms, X is a member of the group consisting of hydrogen and fluorine, Y is an arrangement selected from the group consisting of

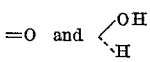

$R^2$ and $R^3$ are members of the group consisting of hydrogen and substituted and unsubstituted aliphatic, aromatic and mixed aliphatic-aromatic hydrocarbon radicals having up to about 12 carbon atoms, and Z is a member of the group consisting of a double bond between C–1 and C–2 and a single bond between C–1 and C–2.

4. A 6-cyano-ketalic steroidal derivative corresponding to the general formula:

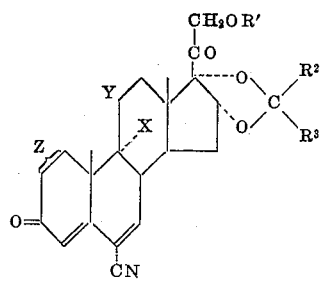

in which R' is a member of the group consisting of hydrogen and acyl radicals derived from hydrocarbon carboxylic acids having up to 12 carbon atoms, X is a member of the group consisting of hydrogen and fluorine, Y is an arrangement selected from the group consisting of

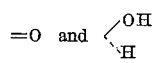

$R^2$ and $R^3$ are members of the group consisting of hydrogen and substituted and unsubstituted aliphatic, aromatic and mixed aliphatic-aromatic hydrocarbon radicals having up to about 12 carbon atoms, and Z is a member of the group consisting of a double bond between C–1 and C–2 and a single bond between C–1 and C–2.

5. 6α-cyano-16α-hydroxy-cortisone.
6. 6α-cyano-16α-hydroxy-hydrocortisone.
7. 6α-cyano-16α-hydroxy-prednisone.
8. 6α-cyano-16α-hydroxy-prednisolone.
9. 6-cyano-$\Delta^{4,6}$-pregnadien-16α,17α,21 - triol - 3,11,20-trione.
10. 6-cyano-$\Delta^{4,6}$-pregnadiene - 11β,16α,17α,21 - tetrol-3,20-dione.
11. 6-cyano-$\Delta^{1,4,6}$-pregnatriene-11β,16α,17α,21 - tetrol-3,20-dione.
12. 6-cyano-$\Delta^{1,4,6}$-pregnatriene-16α,17α,21 - triol - 3,11, 20-trione.

References Cited in the file of this patent

UNITED STATES PATENTS

| | | |
|---|---|---|
| 2,789,118 | Bernstein et al. | Apr. 16, 1957 |
| 2,806,043 | Bernstein et al. | Sept. 10, 1957 |
| 2,838,545 | Magerlein et al. | June 10, 1958 |
| 2,838,546 | Magerlein et al. | June 10, 1958 |
| 2,838,547 | Magerlein et al. | June 10, 1958 |
| 2,838,548 | Magerlein et al. | June 10, 1958 |
| 2,864,836 | Lincoln et al. | Dec. 16, 1958 |
| 2,864,838 | Lincoln et al. | Dec. 16, 1958 |

OTHER REFERENCES

Fried et al.: J. Am. Chem. Soc., vol. 80 (May 5, 1958), pages 2338 and 2339.

Ringold et al.: J. Am. Chem. Soc., vol. 80 (Dec. 5, 1958), pages 6464 and 6465.

Mills et al.: J. Am. Chem. Soc., vol. 81 (Mar. 5, 1959), pages 1264 and 1265.